United States Patent [19]

Abe et al.

[11] 4,197,137
[45] Apr. 8, 1980

[54] PROCESS AND APPARATUS FOR CALCINING FINELY DIVIDED CEMENT RAW MATERIALS INCLUDING FINELY DIVIDED COMBUSTIBLE MATERIALS

[75] Inventors: Hidekazu Abe, Tokyo; Yoshifumi Nitta, Matsudo, both of Japan

[73] Assignee: Ishikawajima-Harima Jukogyo Kabushiki Kaisha, Tokyo, Japan

[21] Appl. No.: 965,989

[22] Filed: Dec. 4, 1978

[30] Foreign Application Priority Data

Jul. 12, 1978 [JP] Japan .................................. 53-84011

[51] Int. Cl.² .............................................. C04B 7/44
[52] U.S. Cl. ...................................... 106/100; 106/103
[58] Field of Search ................................ 106/100, 103

[56] References Cited

U.S. PATENT DOCUMENTS

| | | | |
|---|---|---|---|
| 3,873,331 | 3/1975 | Kondo et al. ......................... | 106/100 |
| 4,066,470 | 1/1978 | Brachthauser et al. .............. | 106/100 |
| 4,137,090 | 1/1979 | Nakamura et al. ................... | 106/103 |

*Primary Examiner*—James Poer

*Attorney, Agent, or Firm*—Alfred E. Miller

[57] ABSTRACT

Process and apparatus for calcining finely divided cement raw materials including finely divided combustible materials in a suspension preheater with a calcining furnace. Finely divided calcareous materials are directly charged into the suspension preheater while finely divided argillaceous materials, including combustibles such as oil shale, are charged into a bypass duct for bypassing part of the high temperature gases in the suspension preheater to a calcining zone or calcining furnace. The raw materials charged into the bypass duct are subjected to thermal decomposition, resulting in solids and combustible gases. The combustible gases are separated from the solids and are charged into the calcining zone or calcining furnace while the separated solids are charged into the suspension preheater, mixed with the finely divided calcareous materials, preheated and calcined. Since the finely divided argillaceous materials are mixed with the finely divided calcareous materials, the smooth flow of the cement raw materials in the suspension preheater is ensured.

6 Claims, 3 Drawing Figures

PROCESS AND APPARATUS FOR CALCINING FINELY DIVIDED CEMENT RAW MATERIALS INCLUDING FINELY DIVIDED COMBUSTIBLE MATERIALS

DETAILED DESCRIPTION OF THE INVENTION

The present invention relates to a process and an apparatus for calcining finely divided cement raw materials including finely divided combustible materials such as oil shale.

In the prior art processes and apparatuses of the type described above, finely divided calcareous materials such as limestone are fed into a suspension preheater with a calcining furnace while finely divided argillaceous materials including combustibles such as oil shale are charged directly into the calcining furnace. Since only the finely divided calcareous materials flow through the suspension preheater, the temperature of exhaust gases from the suspension preheater becomes higher than that of the exhaust gases from the suspension preheater wherein the intimate mixture of finely divided argillaceous and calcareous materials flow so as to be preheated and calcined. More specifically, since the finely divided noncombustible calcareous materials charged into the suspension preheater include no argillaceous materials, their quantity is about 75% as compared with conventional cement raw material burning processes. This means that there exist less materials for recovering the heat from the suspension preheater. As a result, the temperature of exhaust gases from the suspension preheater becomes rather high, which means high fuel consumption. Furthermore, when the finely divided calcareous materials are heated above 500° C. in the suspension preheater, their flowability drops, resulting in the clogging of cyclones and consequently the suspension of operation. These have been the technical problems encountered in the prior art cement manufacturing processes and apparatuses of the type described above.

In order to overcome these problems, the inventors made extensive studies and experiments and found out that when oil shale can be thermally decomposed into combustible gases and argillaceous solids that the complete thermal decomposition of oil shale occurs at about 500° C. The present invention is based upon these observed facts and will become apparent from the following description of some preferred embodiments thereof taken in conjunction with the accompanying drawings, in which.

Same reference numerals are used to designate similar parts throughout the figures.

Figure 1:
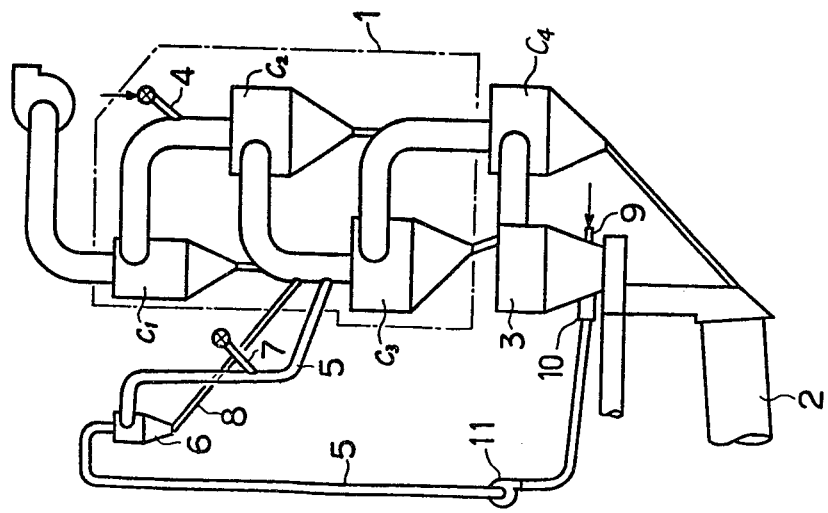

Referring to FIG. 1, a cement burning installation includes a suspension preheater generally indicated by the reference numeral 1 and comprising first, second and third cyclones $C_1$, $C_2$ and $C_3$ connected in series through ducts; a rotary kiln 2; a calcining furnace 3 with a cyclone separator $C_4$; a first feed device 4 for charging noncombustible raw materials mainly consisting of limestone; a bypass duct 5 for drawing part of the exhaust gases from the duct interconnecting between the third and second cyclones $C_3$ and $C_2$ of the suspension preheater 1 so as to bypass the drawn exhaust gases into the calcining furnace 3 through a cyclone separator 6; a second feed device 7 for charging argillaceous materials containing combustibles such as oil shale into the bypass duct 5 at the upstream of the cyclone separator 6; a chute 8 for charging solids collected in the cyclone 6 into the suspension preheater 1; an auxiliary fuel burner 9 for the calcining furnace 3; a combustible gas feed burner 10 for feeding thermally decomposed combustible gases into the calcining furnace 3; and a heat resisting fan 11 inserted in the bypass duct 5.

When cement clinker is produced with the apparatus described above and the materials containing combustibles such as oil shale are used as part of raw materials, the combustible materials are ground into finely divided powder independently of the calcareous materials such as limestone which are incombustible. The finely divided combustible and noncombustible materials are separately weighed so as to maintain a predetermined proportion.

The finely divided noncombustible materials are charged through the first feed device 4 into the suspension preheater as with the case of prior art methods. On the other hand, the finely divided combustible materials are charged into the bypass duct 5 through the second feed device 7 and are thermally decomposed with the high temperature exhaust gases (at 770° to 800° C. and containing $O_2$ in a quantity of about 3%). The resultant combustible gases are separated from solids in the cyclone separator 6 and are charged together with the exhaust gases into the calcining furnace 3 through the combustible gas feed burner 10. The quantity of exhaust gases to be bypassed in the manner described above is preferably 5 to 15% of the total quantity of exhaust gases. The mixture of the combustible and exhaust gases are 300° to 500° C. when charged into the calcining furnace 3.

The calcining furnace 3 is of the turbulence countercurrent type. That is, the exhaust gases from the rotary kiln 2 and the high temperature gases from a clinker cooler (not shown) are charged into the calcining furnace 3 in the counterflow relationship with the materials. Because of the provision of the auxiliary fuel burner 9, the combustible gases thus introduced into the calcining furnace 3 are completely burned.

The solid materials trapped in the cyclone separator 6 are charged through the chute 8 into the duct intercommunicating between the cyclones $C_3$ and $C_2$ of the suspension preheater 1 so as to be mixed with the incombustible materials, preheated and charged from the cyclone $C_3$ into the calcining furnace 3 wherein the noncombustible materials and the trapped solid materials are calcined. The materials thus calcined are charged through the cyclone separator $C_4$ into the rotary kiln 2 and are burned there.

The noncombustible materials themselves flow through the suspension preheater 1 as far as the outlet of the first cyclone $C_1$ without entraining any other materials. At the outlet of the first cyclone $C_1$, the noncombustible materials are at less than 500° C. As a result, the flowability of the noncombustible materials has not been adversely affected so that they flow smoothly. Thereafter, they are mixed with the solid materials which are trapped in the cyclone separator 6. The mixture is further preheated, but even when they are heated above 500° C., the flowability is not adversely affected so that they may smoothly flow through the suspension preheater 1.

So far the exhaust gases have been described as being drawn from the duct interconnecting between the third and second cyclones $C_3$ and $C_2$, but it is to be understood that they may be drawn from the duct interconnecting between the cyclone separator $C_4$ and the third cyclone $C_3$ or between the second and first cyclones $C_2$ and $C_1$. Alternatively, part of the kiln gases from the rotary kiln may be drawn. The solid materials trapped in the cyclone separator 6 may be charged into the duct between the second and first cyclones $C_2$ and $C_1$ instead of the duct between the third and second cyclones $C_3$ and $C_2$.

Figure 2:
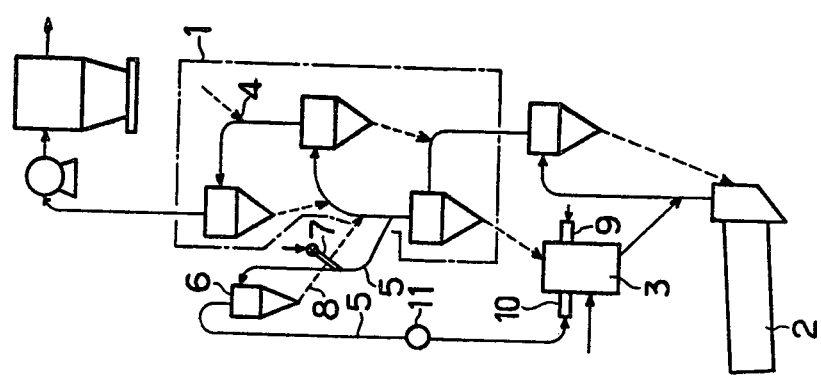
FIGS. 1 and 2 are schematic elevation views, respectively, of first and second embodiments in accordance with the present invention.

The second embodiment as shown in FIG. 2 is substantially similar in construction to the first embodiment described above except that the calcining furnace 3 is of the turbulent countercurrent type and the exhaust gases from the rotary kiln 2 is not charged directly into the calcining furnace 3 but is charged into the lowermost cyclone. The mode of operation of the second embodiment is apparent from the description of the first embodiment so that no further description shall be made in this specification.

Figure 3:
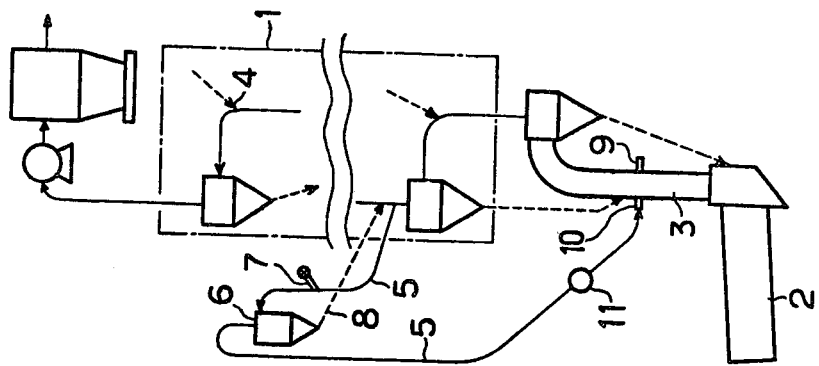
FIG. 3 is a partially cutaway, schematic elevation view of a third embodiment in accordance with the teaching of the present invention.

The third embodiment as shown in FIG. 3 is also substantially similar in construction to the first embodiment. More specifically, in the third embodiment, the exhaust gases from the rotary kiln 2 are charged through a duct into the lowermost cyclone. The duct interconnecting between the rotary kiln 2 and the lowermost cyclone operates as the calcining furnace 3. To this end, this duct is provided with the auxiliary fuel burner 9 and the combustible gas feed burner 10. The mode of operation of the third embodiment is apparent from the description of the first embodiment so that no further description shall be made in this specification.

In summary, according to the present invention, the finely divided argillaceous materials including combustibles are subjected to thermal decomposition outside of the suspension preheater with the calcining furnace. The resultant combustible gases are used as at least part of fuel for the calcining furnace. The solid materials separated from the combustible gases are charged into the preheating zone in the suspension preheater so as to be mixed with the finely divided noncombustible materials, preheated and calcined. As a result, various advantages may be attained as will be described below.

First, even when the noncombustible materials are preheated to higher than 500° C., their flowability is not adversely affected because they are intimately mixed with the finely divided argillaceous materials. Therefore, the clogging of cyclones may be avoided so that the stable operation may be ensured. Second, the exhaust gases are at low temperatures and economy in fuel can be attained. Therefore, the cement raw material calcining process in accordance with the present invention is by far economical as compared with the prior art process wherein finely divided noncombustible materials are charged into the suspension preheater while the finely divided argillaceous materials including combustibles are charged into the calcining furnace.

The calcining apparatus adapted to carry out the cement raw materials calcining process in accordance with the present invention comprises a suspension preheater with a calcining furnace, a bypass duct for drawing the exhaust gases from a heating system of the preheater and bypassing the drawn exhaust gases into the calcining furnace, a cyclone separator which is inserted into the bypass duct and whose solid material outlet is communicated with the suspension preheater, and a combustible material feed device at the upstream side of the cyclone separator for charging the combustible materials into the bypass duct. Therefore, various advantages may be obtained from the present arrangement as will be described below.

First the calcining apparatus may positively carry out the cement raw material calcining process in accordance with the present invention. Second, since the finely divided argillaceous materials including the combustibles are charged into the bypass duct at the upstream of the cyclone separator inserted therein and are subjected to the thermal decomposition when they are flowing from the combustible material feed device to the cyclone separator, no thermal decomposition device is needed and consequently no extra fuel burner for thermal decomposition is needed. Thus, the installation cost, as well as the operation cost, may be remarkably decreased.

What is claimed is:

1. A process for calcining finely divided cement raw materials including finely divided combustible materials in a suspension preheater with a calcining furnace comprising the steps of flowing finely divided noncombustible materials through said suspension preheater so as to preheat them prior to charging them into a calcining zone, having finely divided argillaceous materials including said finely divided combustible materials make contact with high temperature gases so as to decompose said materials into combustible gases and solids, separating said combustible gases from said solids so as to charge the former into said calcining zone, and charging said separated solids into said suspension preheater so as to be mixed with said finely divided noncombustible materials and calcined in said calcining zone.

2. A process as set forth in claim 1 wherein said high temperature gases are part of the exhaust gases from said suspension preheater.

3. A process as set forth in claim 1 wherein said high temperature gases are part of the exhaust gases from a burning zone succeeding said calcining zone.

4. A process as claimed in claim 1 wherein said high temperature gases are bypassed exhaust gases from the suspension preheater.

5. A process as claimed in claim 4 wherein the quantity of exhaust gases bypassed are in the range of 5% to 15% of the total quantity of exhaust gases in the system.

6. A process as claimed in claim 1 wherein the mixture of exhaust gases and combustible gases in said calcining zone are in the temperature range of 300° C. to 500° C.

* * * * *